United States Patent [19]
Kaiser et al.

[11] Patent Number: 5,480,682
[45] Date of Patent: Jan. 2, 1996

[54] NON-CRYOGENICALLY GENERATED NITROGEN ATMOSPHERE FOR RADIATION CURING

[75] Inventors: John J. Kaiser, Whitehall; Diwakar Garg, Emmaus, both of Pa.

[73] Assignee: Air Products and Chemicals, Inc., Allentown, Pa.

[21] Appl. No.: 296,338

[22] Filed: Aug. 25, 1994

Related U.S. Application Data

[63] Continuation-in-part of Ser. No. 66,183, May 21, 1993, abandoned.
[51] Int. Cl.$^6$ .............................. B05D 3/06; B01D 59/10
[52] U.S. Cl. ........................ 427/495; 427/496; 427/508; 427/378; 95/47; 95/117; 95/138; 95/139
[58] Field of Search ................ 55/16; 427/495, 427/496, 508, 521, 377, 378; 264/22, 25; 95/116

[56] References Cited

U.S. PATENT DOCUMENTS

| | | | |
|---|---|---|---|
| 3,535,074 | 10/1970 | Nakashima | 23/2 |
| 3,798,053 | 3/1974 | Huemmer | 427/507 |
| 4,160,178 | 7/1979 | Smith et al. | 427/377 |
| 4,249,915 | 2/1981 | Sircar et al. | 55/26 |
| 4,252,413 | 2/1981 | Nablo | 250/310 |
| 4,303,695 | 12/1981 | McCann et al. | 427/44 |
| 4,562,098 | 12/1985 | Ahmed | 427/377 |
| 4,775,474 | 10/1988 | Chau et al. | 264/22 |
| 4,859,435 | 8/1989 | Roberts et al. | 423/219 |
| 4,919,856 | 4/1990 | Anazawa et al. | 264/22 |
| 4,931,070 | 6/1990 | Prasad | 55/16 |
| 4,954,144 | 9/1990 | Burgoyne, Jr. et al. | 55/16 |
| 4,976,897 | 12/1990 | Callahan et al. | 264/22 |
| 4,985,274 | 1/1991 | Wright | 427/38 |
| 4,994,095 | 2/1991 | Kawakami et al. | 55/16 |
| 5,004,482 | 4/1991 | Haas et al. | 55/16 |
| 5,077,029 | 12/1991 | Schaub | 423/351 |
| 5,120,972 | 6/1992 | Rangwalla et al. | 250/492.3 |
| 5,122,355 | 6/1992 | Prasad et al. | 423/351 |
| 5,154,892 | 10/1992 | Luhmann et al. | 422/111 |
| 5,186,727 | 2/1993 | Chang | 95/117 |
| 5,207,806 | 5/1993 | Lagree et al. | 95/47 |
| 5,275,640 | 1/1994 | Schroter et al. | 95/138 |

OTHER PUBLICATIONS

"Radiation Curing Primer I: Inks, Coatings and Adhesives." Published by RadTech International North America; Northbrook, Ill. (1990); p. 51 no month.

Primary Examiner—Marianne Padgett
Attorney, Agent, or Firm—Geoffrey L. Chase

[57] ABSTRACT

The present invention discloses an improved method of producing a low-cost, nitrogen-based inert atmosphere suitable for radiation curing of resins, coatings, etc. from non-cryogenically generated nitrogen. According to the disclosed method, residual oxygen present in non-cryogenically generated nitrogen is converted to either moisture or a mixture of moisture and carbon dioxide by reaction with a reducing gas in a catalytic reactor prior to using the nitrogen-based atmosphere for radiation curing of moisture insensitive materials such as resins and coatings.

9 Claims, 1 Drawing Sheet

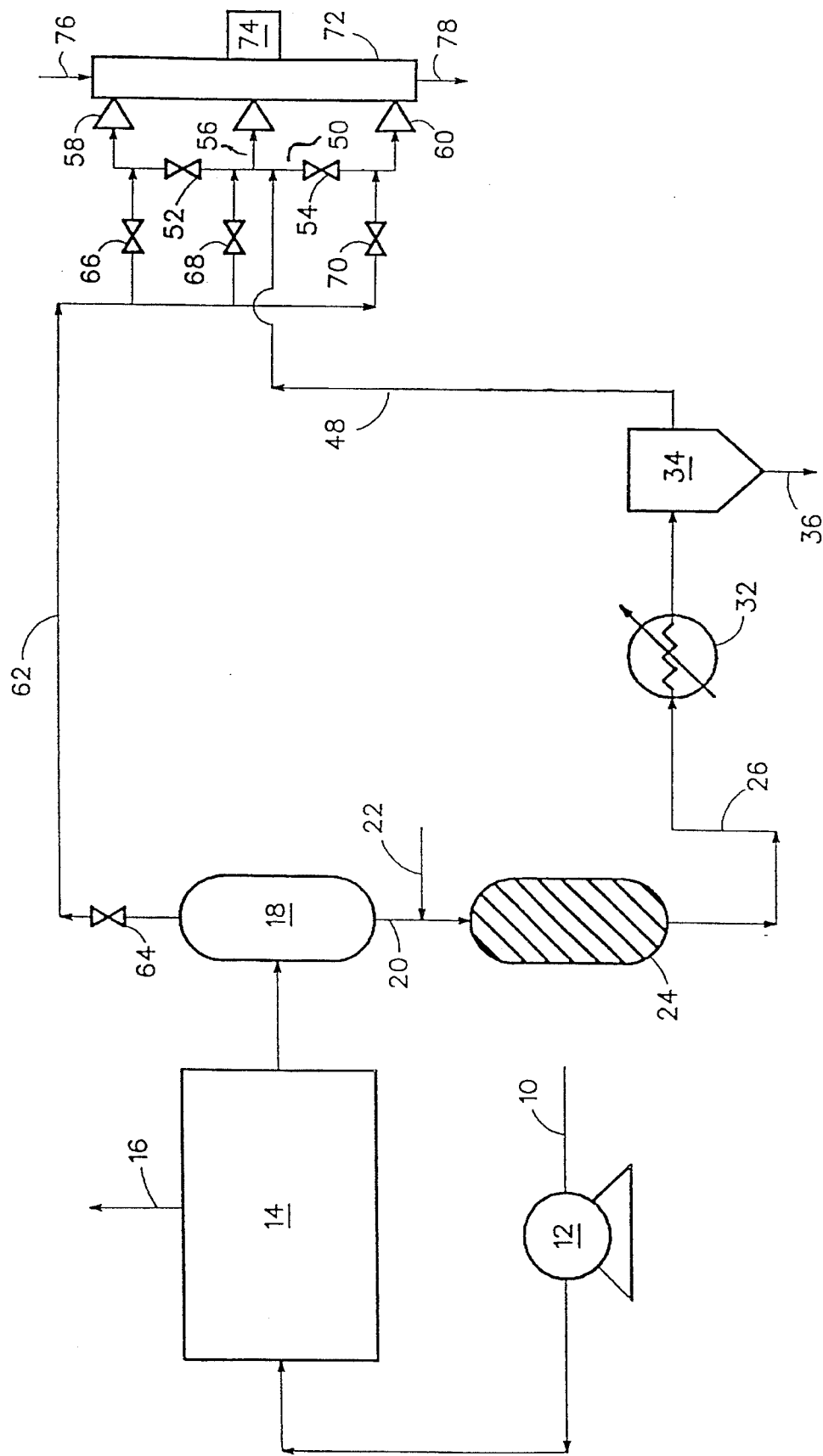

NON-CRYOGENICALLY GENERATED NITROGEN ATMOSPHERE FOR RADIATION CURING

This is a continuation-in-part application of application Ser. No. 08/066,183 filed May 21, 1993 now abandoned.

TECHNICAL FIELD

The present invention is directed to the field of radiation curing of moisture insensitive coatings or printing on a substrate, such as plastic film, or moisture insensitive materials in an atmosphere of noncryogenically produced nitrogen in which residual oxygen is converted to moisture or a mixture of moisture and carbon dioxide with a reducing agent in the presence of a catalyst.

BACKGROUND OF THE INVENTION

Radiation curing is a chemical manufacturing process which utilizes electromagnetic radiation energy to change the chemical and physical nature of organic chemical materials by cross-linking, polymerizing, drying, solidifying or degrading polymer network. Radiation curing has been applied to a variety of materials including paper, wood, metal, leather, vinyl, plastic, glass, magnetic recording tape, human hair, ink, etc. Radiation curing processes are commercially applied today for adhesives (such as pressure sensitive tapes and labels, laminated foils and films, flocked materials for automotive and shoe applications, structural adhesives, etc.), abrasives (such as coated abrasive products for microfinishing, glass lens grinding and polishing, burnishing, etc.), release coatings (such as silicone coatings on paper and plastics), metal coatings, overprint coatings, flooring, wood finishing, food and perfume packaging, printing, photopolymer plates, electronics, dental and medical applications, magnetic media, fiber optics, lithography, etc.

The primary sources of radiation for radiation curing include electron beam (e-beam), infrared (IR), ultraviolet (UV), and laser.

It is generally known that a part of radiation energy used for curing resins and coatings is converted to heat during curing, causing an increase in the atmosphere temperature. It is also known that an increase in the atmosphere temperature will raise the temperature of the coating being cured, thereby damaging the coating or resulting in cured coating with undesirable properties. Therefore, it is desirable to carefully control the temperature of both the atmosphere and the coating being cured to obtain the desired material properties.

Overheating of the atmosphere and the coating being cured can be controlled by using a high speed at which the curing coating traverses under the radiation source. Additionally, a water-cooled drum positioned directly under the radiation source can also be used to help in removing heat from the radiation chamber and the substrate being cured. However, black bodies, soft substrates, and temperature sensitive substrates still require proper care and an external source for removing heat from the radiation chamber. In order to properly control the temperature in the radiation chamber and produce cured coatings with desirable properties, these materials are generally processed in the presence of high flow rates of an ambient temperature and high purity (containing 99.999% by volume inert gas) inert gas, such as nitrogen, argon or helium. The high flow rate of high purity inert gas helps in removing heat and preventing buildup of heat in the radiation chamber.

Besides controlling the temperature of the coating, high purity inert gas prevents buildup of oxygen in the radiation curing chamber, which is known to abstract hydrogen from the coating material and inhibit the curing process, as well as form ozone gas. The effect of oxygen on performance of sources of radiation and applications of radiation curing can be found in "Radiation Curing Primer I: Inks, Coatings and Adhesives" published by RadTech International North America, Northbrook, Ill. (1990) Page 51. The presence or buildup of oxygen in the radiation curing chamber is not desirable because it will be converted to ozone in the presence of a radiation source, presenting safety and health related problems and requiring additional processing steps to treat chamber gases prior to their venting or disposal.

The use of high purity nitrogen gas for inerting radiation curing chambers and purging oxygen barriers has been known for years. It has been disclosed in U.S. Pat. Nos. 4,252,413 and 4,303,695. The nitrogen gas used in radiation curing is generally supplied by vaporizing more expensive cryogenically produced high purity liquid nitrogen.

The production of high purity nitrogen has, for many years, been carried out by employing state-of-the-art air separation technology based on cryogenic distillation techniques. Because of the favorable economics of scale-up for such cryogenic distillation, large tonnage nitrogen users are supplied with nitrogen gas piped from a cryogenic plant installed on the users' site. Smaller tonnage users, i.e., 2–30 tons/day or less, are typically supplied with liquid nitrogen trucked to the users' site from a centrally located liquid nitrogen production plant. The cost of liquefying nitrogen gas and of transporting the liquid nitrogen from an off-site cryogenic plant to the users' site adds significantly to the cost of the nitrogen as supplied to the user.

In recent years, therefore, a major challenge in the art has been to develop small tonnage air separation plants that can effectively produce low cost nitrogen gas at the users' site. Recent developments relating to nitrogen production by noncryogenic air separation technologies such as pressure swing adsorption (PSA) and membrane technologies have served to significantly lower the cost of on-site systems for the production of low purity, small tonnage nitrogen. On the other hand, high purity nitrogen cannot be economically produced by such PSA or membrane systems because of practical imitations rendering the power requirements and the cost of such systems prohibitive.

A hybrid atmosphere radiation curing system utilizing inexpensive, relatively impure, non-cryogenically generated nitrogen containing up to 5% by volume residual oxygen as an impurity for purging oxygen barriers and high purity, more expensive, cryogenically generated pure nitrogen stream containing less than 10 ppm by volume residual oxygen for purging the processing chamber has been disclosed in U.S. Pat. No. 5,120,972. According to the teachings of this patent, the overall atmosphere cost can be substantially reduced by using an impure, low cost non-cryogenically generated nitrogen for purging oxygen barriers. More importantly, this patent teaches against using non-cryogenically generated nitrogen in the radiation curing chamber.

U.S. Pat. No. 4,985,274 discloses a process of purifying nitrogen containing impurities in the form of oxygen by reacting it with a reducing gas in the presence of a radiation source. The purification of a nitrogen stream containing oxygen with a radiation source is neither desirable nor recommended because of the formation of ozone and subsequent safety problems caused by the formation of ozone.

OSHA limits workers exposure to less than 0.1 ppm TWA for an 8 hour exposure.

Various forms of cryogenic and non-cryogenic nitrogen production and purification are known as set forth in the art below.

U.S. Pat. No. 5,154,892 discloses a method and apparatus for maintaining an inert atmosphere at an irradiation chamber using pure inert gas such as nitrogen, as well as recirculated inert gas.

U.S. Pat. No. 3,535,074 discloses the conversion of oxygen present in nitrogen to water by reaction with hydrogen in the presence of a noble metal catalyst.

U.S. Pat. No. 4,931,070 discusses the separation of air by membrane to produce nitrogen in which residual oxygen is reacted to create water. The wet nitrogen is dried by membrane separation on.

U.S. Pat. No. 5,004,482 discloses a process for producing dry nitrogen from a pressure swing adsorptive separation of air with membrane drying either before or after the air separation.

U.S. Pat. No. 5,077,029 discloses the controlled introduction of hydrogen into an oxygen containing nitrogen product of membrane or adsorptive air separation.

U.S. Pat. No. 5,122,355 discloses membrane separation of air to produce nitrogen which is further treated to reaction with hydrogen over a catalyst to convert oxygen to water with subsequent adsorptive drying.

U.S. Pat. No. 4,859,435 discloses the deoxygenation of nitrogen by catalytic reaction with methanol.

U.S. Pat. No. 4,249,915 describes adsorptive removal of moisture and carbon dioxide from air in separate adsorptive beds.

Other patents of interest are U.S. Pat. No. 4,954,144 and 4,994,095.

In order to lower the costs of nitrogen used for inert gas radiation curing, the art has suggested to use high purity cryogenically produced nitrogen at the radiation chamber and lower purity non-cryogenically produced nitrogen at the outer gaseous knives of radiation curing apparatus. The disadvantage of this hybrid system is that two nitrogen sources are required and expensive liquid nitrogen is still required for purging oxygen from the radiation chamber. This liquid nitrogen, at the capacities required, cannot justify on-site generation, but must be trucked in from off-site cryogenic air separation plants at considerable expense and subject to potential inconsistent delivery. The present invention overcomes the drawbacks of this prior art by providing on-site generation of non-cryogenic nitrogen at purity requirements sufficient for a radiation chamber of a radiation curing apparatus which provides lower cost inerting with consistent supply, as set forth in greater detail below.

BRIEF SUMMARY OF THE INVENTION

The present invention is a method of generating a nitrogen atmosphere and radiation curing of a moisture insensitive material to be cured in the nitrogen atmosphere, comprising the steps of: (a) separating air to produce a nitrogen-rich gas containing residual oxygen by a separation selected from the group consisting of adsorptive separation to produce a nitrogen-rich gas containing residual oxygen gas and a membrane permeation separation to produce a nitrogen-rich gas containing residual oxygen gas; (b) contacting the nitrogen-rich gas containing residual oxygen gas with a reducing gas to react with the oxygen gas in the presence of a catalyst to generate a nitrogen-rich gas containing moisture and 10 ppm or less by volume of oxygen gas; (c) passing the moisture insensitive material to be cured into a first zone of controlled atmosphere having a low oxygen gas content up to 5% by volume oxygen gas to reduce the concentration of oxygen gas at a barrier layer near a surface of the moisture insensitive material wherein the first zone is controlled to have a low oxygen gas content by introduction of a gas selected from the group consisting of nitrogen-rich gas containing residual oxygen gas and nitrogen-rich gas containing moisture and 10 ppm or less by volume oxygen gas; (d) passing the moisture insensitive material to be cured into a second zone of a nitrogen atmosphere having less than 100 ppm by volume oxygen gas and irradiating the moisture insensitive material to cure the moisture insensitive material with a source of radiation wherein the second zone is controlled to have less than 100 ppm by volume oxygen gas by the introduction of the nitrogen-rich gas containing moisture and 10 ppm or less by volume oxygen gas into the second zone; and (e) removing the moisture insensitive material from the second zone having at least partially cured the moisture insensitive material.

Preferably, the residual oxygen content in the nitrogen-rich gas containing residual oxygen is in the range of about 0.05% to about 3% by volume.

Preferably, the source of radiation is selected from the group consisting of electron beam, infrared radiation, ultraviolet radiation and visible spectrum laser light.

Preferably, the reducing gas is selected from the group consisting of hydrogen, methanol, hydrocarbons, dissociated ammonia and mixtures thereof.

Preferably, the reducing gas is supplied to the nitrogen-rich gas containing residual oxygen gas in a range of a stoichiometric ratio of the reducing gas to the oxygen gas up to 1.2 times a stoichiometric ratio of the reducing gas to the oxygen gas.

Preferably, the nitrogen-rich gas containing moisture and 10 ppm or less by volume oxygen gas also contains carbon dioxide.

Preferably, the moisture insensitive material is a coating on a substrate.

Preferably, the catalyst is selected from the group consisting of platinum, palladium, rhodium, ruthenium and mixtures thereof.

More specifically the present invention is a method of generating a nitrogen atmosphere having less than 100 ppm by volume of oxygen gas and electron beam curing of a material to be cured in the nitrogen atmosphere, comprising the steps of: (a) separating air to produce a nitrogen-rich gas containing residual oxygen gas up to 3% by volume oxygen gas by a separation selected from the group consisting of an adsorption separation to produce a nitrogen-rich gas containing residual oxygen gas and a membrane permeation separation to produce a nitrogen-rich gas containing residual oxygen gas; (b) contacting the nitrogen-rich gas containing residual oxygen gas with a reducing gas to react with the oxygen gas in the presence of a catalyst to generate a nitrogen-rich gas containing moisture and 10 ppm or less by volume of oxygen gas; (c) passing the moisture insensitive material to be cured into a first zone of controlled atmosphere having a low oxygen gas content no greater than 3% by volume oxygen gas wherein the first zone is controlled to have a low oxygen gas content by the introduction of a portion of the nitrogen-rich gas containing residual oxygen gas up to 3% by volume oxygen gas into the first zone as a gas knife to strip barrier layer oxygen gas from near a surface of the moisture insensitive material; (d) passing the moisture insensitive material to be cured into a second zone of a nitrogen atmosphere having less than 100 ppm by volume of oxygen gas and irradiating the moisture insensitive material with the electron beam to cure the moisture insensitive material wherein the oxygen gas content of the second zone is controlled by the introduction of the nitrogen-rich gas containing moisture and 10 ppm or less by volume oxygen gas into the second zone; and (e) removing the moisture insensitive material from the second zone having at least partially cured the moisture insensitive material.

The present invention is also an apparatus for generating a nitrogen atmosphere and electron beam curing of a moisture insensitive material to be cured in the nitrogen atmosphere, comprising: (a) means for separating air to produce a nitrogen-rich gas containing residual oxygen gas up to 3% by volume by a separatory device selected from the group consisting of a vessel of adsorbent to produce a nitrogen-rich gas containing residual oxygen gas when contacted with air and a permeable membrane to produce a nitrogen-rich gas containing residual oxygen gas when contacted with air; (b) means for reacting the nitrogen-rich gas containing residual oxygen gas with a reducing gas which reacts with the residual oxygen gas in the presence of a catalyst to generate a nitrogen-rich gas containing moisture and 10 ppm or less by volume oxygen gas; (c) a first chamber of controlled atmosphere having a low oxygen content up to 5% by volume oxygen gas configured to pass a moisture insensitive material to be cured through the first chamber; (d) a gas knife located in the first chamber to strip barrier layer oxygen gas from near a surface of the moisture insensitive material wherein the first chamber is controlled to have a low oxygen gas content up to 5% by volume oxygen gas by the introduction of a portion of the nitrogen-rich gas containing residual oxygen gas up to 3% by volume oxygen gas into the first chamber through the gas knife; (e) a second chamber of a nitrogen atmosphere having less than 100 ppm of oxygen gas configured to pass the moisture insensitive material to be cured therethrough wherein the oxygen gas content of the second chamber is controlled by the introduction of the nitrogen-rich gas containing moisture and 10 ppm or less by volume oxygen gas into the second zone; and (f) means for irradiating the moisture insensitive material with the electron beam to cure the moisture insensitive material located in the second chamber and at least partially curing the moisture insensitive material.

Preferably, the means for reducing is a bed of catalyst through which the nitrogen-rich gas containing residual oxygen gas passes.

Preferably, the means for separating air is at least two parallel connected vessels of adsorbent to adsorb oxygen gas from air and produce unadsorbed nitrogen containing residual oxygen gas having appropriate valves to allow one vessel to process air to produce the nitrogen containing residual oxygen gas while the other vessel is regenerated by removal of adsorbed oxygen gas.

Alternatively, the means for separating air is a membrane permeable to oxygen gas to produce an oxygen gas-rich permeate and the nitrogen containing residual oxygen gas as a reject stream.

BRIEF DESCRIPTION OF THE DRAWING

The drawing is a schematic illustration of a preferred embodiment of the present invention.

DETAILED DESCRIPTION OF THE INVENTION

It is believed that the overall cost of nitrogen can be reduced by using a nitrogen atmosphere for radiation curing produced solely from non-cryogenically generated nitrogen. Therefore, it is the objective of the present invention to provide an improved method for producing a low-cost, nitrogen atmosphere suitable for radiation curing moisture insensitive materials solely from non-cryogenically generated nitrogen. Moisture insensitive materials are materials that will successfully and adequately cure (i.e. cross-link, polymerize, adhere or solidify) in the presence of moisture or at least in the presence of an atmosphere containing up to 2% by volume moisture. According to the present invention, a nitrogen atmosphere is produced by converting residual oxygen present in non-cryogenically generated nitrogen with a reducing gas to moisture or a mixture of moisture and carbon dioxide in a catalytic reactor prior to using it for curing moisture insensitive materials. Preferably, the moisture insensitive material is also carbon dioxide insensitive which shall be deemed to mean that the material can be cured in the presence of carbon dioxide without adverse effects on curing or the cured material.

The present invention thus combines an improved method of producing low-cost, nitrogen atmosphere with radiation curing wherein the gas used to purge oxygen from the radiation curing zone or station is sourced solely from non-cryogenically generated nitrogen. According to the present invention, the residual oxygen present in non-cryogenically generated nitrogen is converted to moisture or a mixture of moisture and carbon dioxide by reacting it with a reducing gas in a catalytic reactor prior to using it for curing moisture insensitive materials. The nitrogen atmosphere thus produced contains moisture or a mixture of moisture and carbon dioxide, 10 ppm or less by volume of residual oxygen, and less than 2,000 ppm of residual reducing gas. Alternatively, a part of the non-cryogenically generated nitrogen containing residual oxygen can be used for purging non-critical areas, such as oxygen barriers having controlled oxygen content atmospheres, without any treatment. These areas of controlled atmosphere have oxygen content substantially less than ambient air, such as less than 21% $O_2$, preferably less than 5% $O_2$ by volume, more preferably less than 3% $O_2$ by volume. The remaining portion of the nitrogen, which is used for purging the radiation curing chamber, is treated to convert or remove residual oxygen to lower levels, such as 10 ppm or less by volume oxygen.

Non-cryogenically generated nitrogen used in the method of the present invention can be generated using well-known techniques, such as pressure swing adsorption (PSA) or permeation (membrane). The nitrogen generated by these techniques is generally impure and is contaminated with residual oxygen. This non-cryogenically generated nitrogen gas containing residual oxygen has an oxygen content from about 0.05% to about 3%. It can preferably vary from about 0.05% to about 2%. More preferably, it can vary from about 0.05% to about 1.0%.

The amount of reducing gas required for converting residual oxygen to moisture or a mixture of moisture and carbon dioxide will depend upon the concentration of residual oxygen gas present in non-cryogenically generated nitrogen. A nitrogen atmosphere containing very low levels of oxygen gas can be produced by mixing non-cryogenically generated nitrogen with slightly more than a stoichiometric ratio of a reducing gas theoretically needed to convert residual oxygen to moisture or a mixture of moisture and carbon dioxide and reacting it in a catalytic reactor. The nitrogen atmosphere thus produced will contain nitrogen, up to 2% by volume of moisture or a mixture of up to 2% by volume of moisture and up to 1.5% by volume carbon dioxide, 10 ppm or less by volume residual oxygen, and less than 2,000 ppm of reducing gas.

The amount of reducing gas required for converting residual oxygen to moisture or a mixture of moisture and carbon dioxide in a catalytic reactor in general can vary from close to a stoichiometric ratio to about 1.2 times the stoichiometric ratio. Preferably, it can vary from close to a stoichiometric ratio to about 1.05 times the stoichiometric amount. The stoichiometric ratio is defined as the theoretical ratio of a reducing gas to residual oxygen required to completely convert residual oxygen to moisture or a mixture of moisture and carbon dioxide. The reducing gas can be supplied in a gaseous form from high pressure gas or by vaporizing liquid feedstock.

The reducing gas required for converting residual oxygen to moisture or a mixture of moisture and carbon dioxide can be selected from hydrogen, methanol or a hydrocarbon gas such as natural gas, petroleum gas, methane, propane, dissociated ammonia (75% $H_2$, 25% $N_2$), etc.

The catalytic reactor used for converting residual oxygen to moisture or a mixture of moisture and carbon dioxide by reaction with a reducing gas is packed with a precious metal catalyst supported on a high surface area support material made of alumina, magnesia, zirconia, silica, titania, or mixtures thereof. The precious metal catalyst can be selected from platinum group metals such as platinum, palladium, rhodium, ruthenium, or mixtures thereof. The metal concentration in the catalyst can vary from about 0.05 to about 1.0 wt %. Preferably, the catalyst is approximately 0.5 wt % palladium or platinum in the metal form supported on a high surface area alumina. The catalyst can be shaped in the form of pellets or balls. The precious metal catalyst can optionally be supported on a metallic or a ceramic honeycomb structure.

The hourly flow rate of the gaseous mixture of non-cryogenically produced nitrogen containing residual oxygen and a reducing gas flowing through the catalytic reactor can vary from about 4,000 to 50,000 times the volume of the reactor. It can preferably vary from about 4,000 to 20,000 times the volume of the reactor. More preferably, it can vary from about 4,000 to 10,000 times the volume of the reactor.

No external heating of the reactor or gaseous feed mixture will be required if hydrogen is used as a reducing gas and non-cryogenically generated nitrogen containing residual oxygen gas is supplied at a temperature of 50° F. or above. This is because the reaction between hydrogen and oxygen over the above described catalysts is self-initiating in nature. The catalytic reactor will heat up automatically because of the exothermic nature of the reaction. The final temperature of the reactor will depend upon the concentration of the residual oxygen in the feed stream. However, it may be necessary to heat the reactor initially to start the reaction if hydrogen is used as a reducing gas and non-cryogenically generated nitrogen is supplied at a temperature below about 50° F. The external heating of the reactor may preferably be turned off once the reaction has been initiated.

If methanol is used as a reducing material, it needs to be vaporized first prior to mixing with non-cryogenically generated nitrogen containing residual oxygen gas and feeding the gaseous mixture into the catalytic reactor. Additionally, the gaseous feed mixture or the catalytic reactor needs to be heated to about 150° F. to initiate and sustain reaction between residual oxygen gas and methanol, as disclosed in U.S. Pat. No. 4,859,435.

The gaseous feed mixture or the catalytic reactor needs to be heated to a temperature above about 480° F. if a hydrocarbon gas such as natural gas, petroleum gas, methane, propane, etc., is used for converting residual oxygen gas to a mixture of moisture and carbon dioxide.

The non-cryogenically generated nitrogen stream treated to convert residual oxygen to moisture or a mixture of moisture and carbon dioxide is cooled to a temperature below about 100° F. and passed through a phase separator to remove condensate prior to using it for radiation curing. Non-cryogenically produced nitrogen containing 10 ppm or less by volume of oxygen gas thus produced contains moisture or a mixture of moisture and carbon dioxide and is most suitable for curing materials or coatings that are not sensitive to moisture.

A preferred embodiment of the present invention will now be described with reference to the drawing. Air in line 10 is compressed to elevated pressure in compressor 12 and introduced into a noncryogenic air separation device 14 after passing through a demister and filter which are not shown in the figure. The noncryogenic air separation device 14 can be a semi-permeable membrane, preferably selective to the permeation of oxygen, as a permeate, through the membrane and removed as a waste effluent in line 16. The nitrogen contained in the air is rejected by the membrane and remains at essentially elevated pressure from compressor 12 and is transferred to surge or storage tank 18.

Alternatively, the noncryogenic air separation device 14 may be two or more parallel-connected beds of adsorbent, which are preferably selective to the adsorption of oxygen over nitrogen in the air providing a nitrogen product to the surge or storage tank 18, while during regeneration an oxygen-rich waste or effluent is removed in line 16. The adsorptive separation embodiment may be performed in either a pressure swing adsorption mode or a vacuum swing adsorption mode. Preferably, the embodiment utilizing adsorptive separation uses two parallel adsorption beds packed with carbon molecular sieve. While one bed is on feed, the other bed is depressurized to remove oxygen and regenerate the carbon for further service.

In either event of membrane separation or adsorptive separation, the resulting product in surge or storage tank 18 is a nitrogen gas containing residual oxygen typically in the 0.05 to 3% oxygen by volume content of the nitrogen gas, preferably 0.05 to 2% oxygen content and more preferably 0.05 to 1% oxygen content.

To further remove the oxygen from the non-cryogenically produced nitrogen containing up to 3% oxygen by volume, the gas is passed through line 20 and contacts a reducing gas 22, which is preferably hydrogen, and enters a catalytic reactor 24, which is packed with a platinum or palladium metal supported on a alumina substrate, where oxygen reacts with hydrogen to form water. The wet stream in line 26 is then cooled in heat exchanger 32 against any convenient source of cooling fluid, such as cold water, to condense a part of the moisture and remove it as condensate in condenser 34 as a waste stream in line 36. The nitrogen gas contains less than 2% by volume moisture, 10 ppm or less by volume of oxygen and less than 2,000 ppm of reducing gas.

In the most effective use of such nitrogen gas containing 10 ppm or less by volume of oxygen gas and less than 2% by volume moisture, this gas is passed through line 48 and is distributed through manifold 50, valves 52 and 54 to the outer gas knives 58 and 60 as well as the lance 56 to purge oxygen from the various zones of the radiation curing device 72, preferably an electron-beam curing device. The gaseous knife 58 at the entrance to the device 72 removes a barrier layer of oxygen from near the surface of a substrate 76 containing a moisture insensitive coating, such as printing to be cured. The atmosphere inside the radiation curing device 72 adjacent the gaseous knife 58 is a controlled atmosphere having a low oxygen content of approximately 0.05 to 3% oxygen. In the vicinity of a radiation curing chamber 74, such as where an electron beam is focused on the moisture insensitive coating to be cured on the substrate 76, the lance 56 delivers a nitrogen gas containing moisture and 10 ppm or less by volume of oxygen to provide a nitrogen atmosphere having essentially no oxygen, wherein the oxygen content is less 100 ppm and more preferably 10 ppm or less by volume. Oxygen infiltration from the down stream end of the device 72 is avoided by the gaseous knife 60 at the exit of the device 72 where the substrate now having a cured coating or printing 78 is removed.

In this embodiment, noncryogenically produced nitrogen containing moisture and 10 ppm or less by volume oxygen is used both at the outer gaseous knives 58 and 60 of the radiation curing device 72, as well as the lance 56 which introduces nitrogen into the radiation curing chamber 74, where a source of radiation, which is preferably an electron beam, actually irradiates the moisture insensitive coating to be cured and operates most effectively in the absence of oxygen. Oxygen is known to inhibit the free radical cross linking and polymerization which irradiation induces and any oxygen present might also create ozone which would be an occupational health and safety hazard to operators of such a curing device.

Because the removal of oxygen from the first chamber or zone approximate to gaseous knife 58 is not as critical as the removal of oxygen from the second chamber or zone constituting the irradiation curing chamber 74, it is possible to use noncryogenically produced nitrogen containing residual oxygen up to 3% by volume in the gaseous knives 58 and 60, while nitrogen gas containing moisture and 10 ppm or less oxygen by volume is used in lance 56. To effect this result, non-cryogenically produced nitrogen containing residual oxygen of up to 3% oxygen by volume from tank 18 is passed through open valve 64 in line 62 and introduced into gaseous knives 58 and 60 through open valves 66 and 70, while valves 52 and 54 are closed. This reduces the demand on the catalytic reduction of residual oxygen in the non-cryogenically produced nitrogen used in areas which are not particularly oxygen sensitive and reduces overall cost of purging oxygen from the inert curing apparatus.

Therefore, two different oxygen content combinations of noncryogenically produced nitrogen gas having either residual oxygen up to 3% by volume oxygen or containing moisture and 10 ppm or less of oxygen by volume may be used in various parts of the radiation curing device 72. Only in the event that non-cryogenically produced nitrogen gas containing residual oxygen in line 62 is used at all points would valve 68 be open.

The result of the present invention is that low cost non-cryogenically produced nitrogen can be utilized in a radiation curing process and apparatus to provide the security and continuity of onsite nitrogen atmosphere production with the favorable economics of avoiding the use of liquid or cryogenically produced nitrogen, which must be trucked into the location of the radiation curing process under the circumstances of the nitrogen demands for most operations of this character. The present invention avoids the drawbacks of the prior art, which required a complex hybrid system situation wherein noncryogenically produced nitrogen must be present with cryogenically produced or liquid nitrogen to meet the requirements of the outer and the radiation curing chamber areas of the radiation curing process or device, respectively. Therefore, the present invention offers considerable advantages in simplicity and economics while still providing a tailored system to custom operate a radiation curing device with various levels of oxygen content in the nitrogen gas as a purge gas and the opportunity to cure moisture insensitive materials or coatings. This level of simplicity, economic operation and capability to tailor the nitrogen gas to the precise needs of the radiation curing provides an unexpected and surprising performance of the present invention over the prior art of radiation curing using nitrogen atmospheres.

The present invention has been set forth with regard to several preferred embodiments, however the full scope of the present invention should be ascertained from the claims which follow.

We claim:

1. A method of generating a nitrogen atmosphere and radiation curing of a moisture insensitive material to be cured in said nitrogen atmosphere, comprising the steps of:
   (a) separating air to produce a nitrogen-rich gas containing residual oxygen gas by a separation selected from the group consisting of adsorptive separation to produce said nitrogen-rich gas containing residual oxygen gas and a membrane permeation separation to produce said nitrogen-rich gas containing residual oxygen gas;
   (b) contacting said nitrogen-rich gas containing residual oxygen gas with a reducing gas to react with said residual oxygen gas in the presence of a catalyst to generate a nitrogen-rich gas containing moisture and 10 ppm or less by volume of oxygen gas;
   (c) passing said moisture insensitive material to be cured into a first zone of controlled atmosphere having a low oxygen gas content up to 5% by volume oxygen gas to reduce the concentration of oxygen gas at a barrier layer near a surface of said moisture insensitive material wherein said first zone is controlled to have said low oxygen gas content by introduction of a gas selected from the group consisting of said nitrogen-rich gas containing residual oxygen gas and said nitrogen-rich gas containing moisture and 10 ppm or less by volume of oxygen gas;
   (d) passing said moisture insensitive material to be cured into a second zone of a nitrogen atmosphere having less than 100 ppm by volume oxygen gas and irradiating said moisture insensitive material to cure said moisture insensitive material with a source of radiation wherein said second zone is controlled to have said nitrogen atmosphere having less than 100 ppm by volume oxygen gas by the introduction of said nitrogen-rich gas containing moisture and 10 ppm or less by volume oxygen gas into said second zone; and
   (e) removing said moisture insensitive material from said second zone having at least partially cured said moisture insensitive material.

2. The method of claim 1 wherein said residual oxygen gas in said nitrogen-rich gas containing residual oxygen gas is in the range of about 0.05% to about 3% by volume.

3. The method of claim 1 wherein said source of radiation is selected from the group consisting of electron beam, infrared radiation, ultraviolet radiation and visible spectrum laser light.

4. The method of claim 1 wherein said reducing gas is selected from the group consisting of hydrogen, methanol, hydrocarbons, dissociated ammonia and mixtures thereof.

5. The method of claim 1 wherein said reducing gas is supplied to said nitrogen-rich gas containing residual oxygen gas in a range of a stoichiometric ratio of said reducing gas to said residual oxygen gas up to 1.2 time said stoichiometric ratio of said reducing gas to said residual oxygen gas.

6. The method of claim 1 wherein said nitrogen-rich gas containing moisture and 10 ppm or less by volume of oxygen gas also contains carbon dioxide.

7. The method of claim 1 wherein said material is a coating on a substrate.

8. The method of claim 1 wherein said catalyst is selected from the group consisting of platinum, palladium, rhodium, ruthenium and mixtures thereof.

9. A method of generating a nitrogen atmosphere having less than 100 ppm by volume of oxygen gas and electron beam curing of a moisture insensitive material to be cured in said nitrogen atmosphere having less than 100 ppm by volume of oxygen gas, comprising the steps of:

(a) separating air to produce a nitrogen-rich gas containing residual oxygen gas up to 3% by volume oxygen gas by a separation selected from the group consisting of an adsorption separation to produce said nitrogen-rich gas containing residual oxygen gas up to 3% by volume oxygen gas and a membrane permeation separation to produce said nitrogen-rich gas containing residual oxygen gas up to 3% by volume oxygen gas;

(b) contacting said nitrogen-rich gas containing residual oxygen gas up to 3% by volume oxygen gas with a reducing gas to react with said residue oxygen gas in the presence of a catalyst to generate a nitrogen-rich gas containing moisture and 10 ppm or less by volume of oxygen gas;

(c) passing said moisture insensitive material to be cured into a first zone of controlled atmosphere having a low oxygen gas content no greater than 3% by volume oxygen gas wherein said first zone is controlled to have said low oxygen gas content by introduction of a portion of said nitrogen-rich gas containing residual oxygen gas up to 3% by volume oxygen gas into said first zone as a gas knife to strip barrier layer oxygen gas from near a surface of said moisture insensitive material;

(d) passing said moisture insensitive material to be cured into a second zone of said nitrogen atmosphere having less than 100 ppm by volume of oxygen gas and irradiating said moisture insensitive material with an electron beam to cure said moisture insensitive material wherein an oxygen gas content of said second zone is controlled by introduction of said nitrogen-rich gas containing moisture and 10 ppm or less by volume oxygen gas into said second zone; and (e) removing said moisture insensitive material from said second zone having at least partially cured said moisture insensitive material.

* * * * *